Sept. 29, 1959     W. J. KATZ     2,906,401

GRIT WASHER

Filed Aug. 13, 1956

*INVENTOR.*
WILLIAM J. KATZ

BY *Ernst W. Schultz*

ATTORNEY

United States Patent Office 2,906,401
Patented Sept. 29, 1959

2,906,401

GRIT WASHER

William J. Katz, Milwaukee, Wis., assignor to Chain Belt Company, Milwaukee, Wis., a corporation of Wisconsin Application August 13, 1956, Serial No. 603,683

2 Claims. (Cl. 209—159)

This invention relates to apparatus for separating materials and particularly for the separation of given, relatively small, solid particles from a liquid also carrying in suspension other solids of lesser specific gravity or having a lesser rate of separation.

The invention is particularly intended for use in cleaning systems such as that shown and described in application Serial No. 595,683, filed July 3, 1956, by Arthur C. Lind, William J. Katz, and Garrett O. McIntosh and joined September 16, 1957 by William N. Konrad as co-inventor therewith in their application for Purification and Reclamation of Liquid Used in Vehicle Washing, where a water slurry of cellulose fibers is directed at a high velocity against the surface of cars or the like to be cleaned of grit.

The principal object of the present invention is to provide the practically complete removal of the grit from the slurry so that the slurry may be safely reused without damaging the finish of the surface to be cleaned and to further provide for the separation of the grit from the slurry without removing any appreciable amount of the cellulose which represents an important cost factor insofar as the economical operation of such a cleaning system is concerned.

Another object of the invention is to provide apparatus which will operate continuously for such purposes and which has a high capacity for a tank of a given size and occupying a given space.

Another object is to provide for the automatic operation of the apparatus with no moving mechanical components directly involved.

Another object is to provide for the agitation of the slurry so that the cellulose particles are freed of the grit and so that the grit is free to pass therebetween and downwardly through the liquid while the liquid carries the cellulose particles upwardly.

According to the invention, the slurry from which the grit is to be removed is introduced into a tank to flow upwardly therein at a given rate which is sufficient to carry the lighter particles to an outlet at the top of the tank. The lower section of the tank receives the heavier particles which are not carried upwardly and also receives any of the lighter particles passing out of the flow. Air is introduced into the lower end of the tank to agitate the mixed particles so that the heavier particles separate out and may be withdrawn. The lighter particles accumulating in the tank above the heavier particles are re-entrained by the slurry entering the tank and vent and baffle means then separate the air from the slurry flowing upwardly toward the outlet.

The drawings furnished herewith illustrate the best mode of carrying out the invention as presently contemplated and set forth hereinafter.

Figure 1:
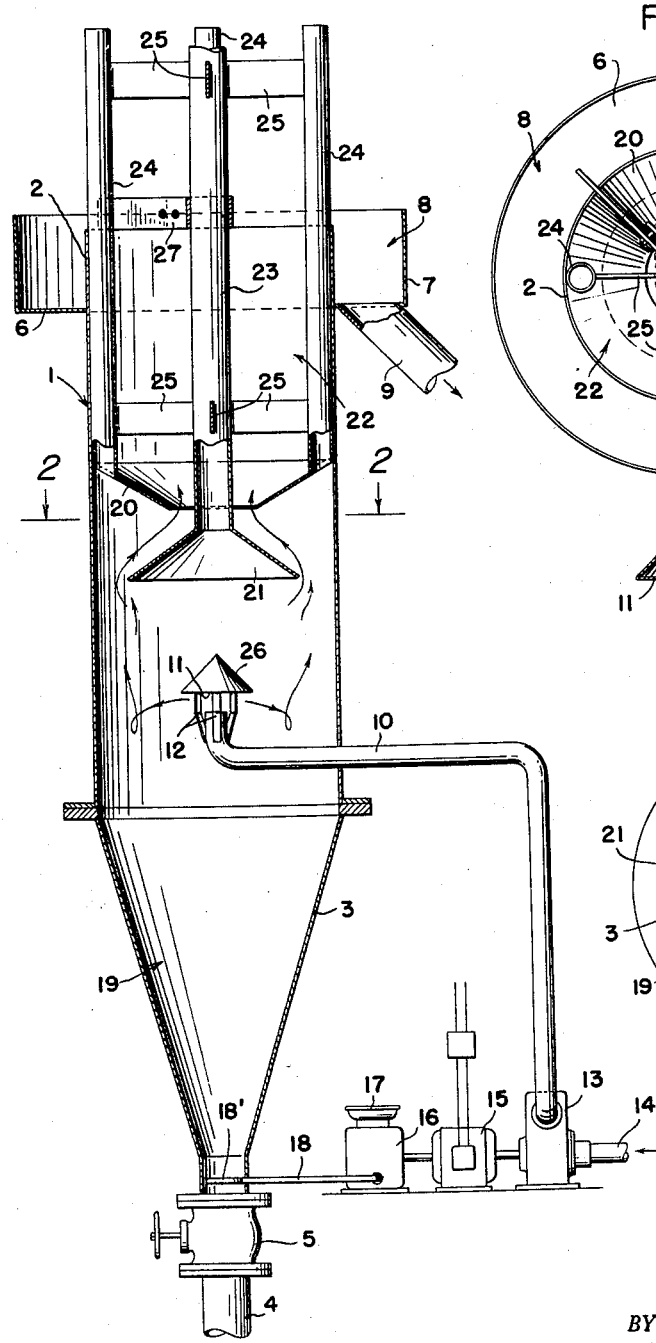
Figure 1 is a vertical cross-section through the tank and includes a motor-driven pump and air compressor shown diagrammatically and connected to the tank.
Figure 3:
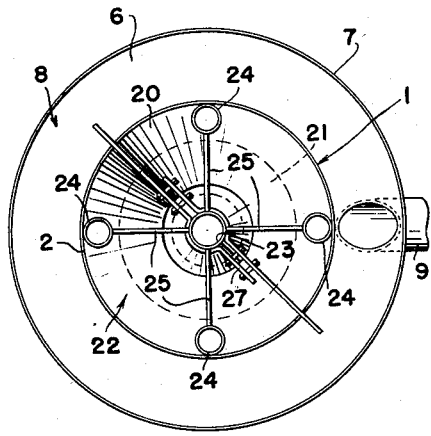
Fig. 3 is a top plan view of the tank.
Figure 4:
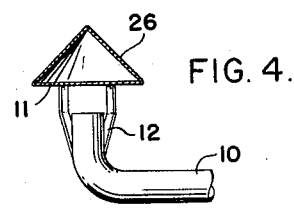
Fig. 4 is an enlarged sectional view of the inlet for the slurry.
Figure 2:
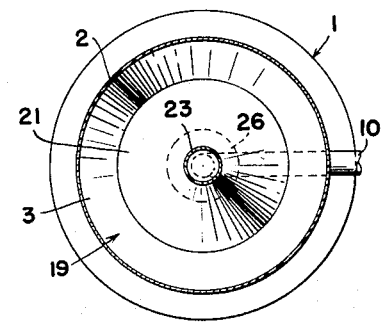
Fig. 2 is a section taken on line 2—2 of Figure 1 showing the top plane of the lower baffle.

The tank 1 shown in the drawings includes the upright open cylindrical member 2 which is joined at its lower end to the upper, larger end of the conical member 3. The lower, smaller end of member 3 is provided with the draw-off pipe 4 having a control valve 5, shown diagrammatically and controlling the withdrawal of the grit from the tank.

The annular ring 6 having an outer upright flange 7 extends around the upper portion of member 2 and is fixed thereto to form the annular collecting trough 8 which drains into the pipe 9 for the return of the reclaimed slurry.

The conduit 10 near the lower end of member 2 extends to the center of the tank and opens upwardly to introduce the slurry in the tank for processing and to direct the same against the circular plate 11 which deflects the slurry radially in a flat stream toward the outside wall of the tank formed by member 2. Plate 11 is shown supported by the arms 12 extending from and fixed to conduit 10.

The slurry is delivered through conduit 10 to tank 1 by the pump 13 receiving the used slurry through the pipe 14 connected thereto. The motor 15 driving pump 13 may be conveniently connected also to the air compressor 16 having an inlet filter unit 17 and the air delivery line 18 opening into the lower end of the generally conical separation chamber 19 and above valve 5. The line 18 may extend within the chamber and connect with a ring-shaped header 18' having a series of circumferentially spaced openings on its lower side.

The frusto-conical, concentric baffles 20 and 21 above conduit 10 are spaced to allow the flow of the liquid from the conduit into the lower end of the classification chamber 22 above the baffles. The lower baffle 21 has its outer periphery disposed downwardly to receive the air from line 18 and rising through the liquid in the tank directly into the space below the baffle 21. The vent pipe 23 connected to baffle 21 extends upwardly through chamber 22 to a height well above trough 8 to provide for the release of the air trapped by baffle 21.

The upper baffle 20 is fitted within member 2 with its outer periphery disposed upwardly and in contact with the inside wall of member 2. The vent pipes 24, similar to vent pipe 23, are spaced about the circular dimension of the baffle and are connected thereto to provide for the release of the air from line 18 which is entrapped by baffle 20. For such purposes, baffle 20 extends over the outer periphery of baffle 21 to assure the entrapment of all the air from line 18 and so that no air reaches chamber 22 which would cause turbulence affecting the classification of the particles in chamber 22. Vent pipes 23 and 24 are connected together by the two sets of cross members 25 so that the pipes and baffles 20 and 21 are vertically movable as a unit and may be disposed at any selected height particularly relative to plate 11 for the most efficient operation. The unit referred to is supported by the clamp 27 adjustably clamped to the center pipe 23, which clamp rests on the upper end of member 2. Baffles 20 and 21 are provided with a sufficient slope so that the grit will not collect on their upper surfaces and plate 11 is provided with the conical upper member 26 for the same purpose.

In the separation of the grit from the slurry which is introduced into the tank immediately below baffles 20 and 21, the influent first fills chamber 19 and thereafter rises in chamber 22 to overflow into trough 8. The cross-section of chamber 22 is of a minimum size for a given delivery of pump 13 so that the speed of flow upwardly is within limits including a lower limit low enough to allow the grit to pass by gravity downwardly through the rising liquid. Chamber 22 is also of a height so that the upper limit for such flow allows sufficient time for such classification to take place.

Agitation of the mixed particles in chamber 19 is provided by the air rising from the lower end of the chamber whereby the grit particles gradually settle downwardly and concentrate in the lower zone of the chamber to be withdrawn continuously or regularly as by manual operation of valve 5. Such withdrawal should, of course, be at a rate no greater than the rate at which the grit is accumulated so that no cellulose particles are also withdrawn.

Chamber 19 is of an adequate height for the establishment of clearly defined zones or stages of such separation of the heavier grit particles from the lighter particles therein. The latter includes cellulose particles unavoidably dropping out of the influent at points where a minimum velocity is not maintained and also dropping out because of being weighted by grit adhering thereto. To effect separation of such particles, the opening between conduit 10 and plate 11 is limited to effect considerable turbulence in the zone above chamber 19 while at the same time the air in chamber 19 is passed through such turbulent flow before reaching baffles 20 and 21.

The accumulation of cellulose in the upper zone of chamber 19 which develops is limited when such accumulation reaches conduit 10 and the uppermost cellulose particles are re-entrained by the liquid and carried to the top of the tank for discharge into trough 8. At the same time other cellulose particles, particularly including those weighted by grit adhering thereto, drop out of the flow and into chamber 19 as previously described.

The air from line 18 which is allowed to rise through the influent at conduit 10 facilitates the separation of the grit from the cellulose particles so that no cellulose particles with gritty particles adhering thereto or comingling therewith are carried upwardly into trough 8. The slurry which passes over the top of member 2 into trough 8 is therefore free of grit and may thus be reprocessed and reused any number of times.

Various modes of carrying out the invention are contemplated as within the scope of the following claims particularly pointing out and distinctly claiming the subject matter which is regarded as the invention.

I claim:

1. Apparatus for the classification of heavier and lighter particles carried in suspension in a liquid and for the separation and removal of the heavier particles therefrom, comprising a tank having an inlet for the influent liquid, said tank having an upper section above said inlet and an outlet at the top thereof, said upper section having an adequate height and predetermined cross-section providing a given rate of upward flow of the liquid with a minimum of turbulence for the classification of said particles wherein the lighter particles are carried upwardly by said flow to said outlet opening and the heavier particles are allowed to gravitate out of said flow, said tank having a conical section below said inlet for receiving said heavier particles and any of the lighter particles dropping out of the influent, an air supply connected to the lower end of said conical section for the introduction of air and the agitation of the particles in said lower section to promote separation of said particles therein, a discharge opening at the lower end of said conical section of the tank for the withdrawal of the heavier separated particles, stationary means directing the influent liquid across the upper end of said conical section to re-entrain and carry upwardly the lighter separated particles accumulating in the upper part of said conical section, and baffles arranged within the tank above said means and disposed to entrap the air and having vent means extending above the height of said outlet for the separate release of the air from the tank to avoid agitation of the liquid in said upper section and flowing to said outlet, said baffles being disposed to entrap the air only after the air has passed through the influent to facilitate the downward passage of the heavier particles therethrough.

2. Apparatus for the classification of two different solids and the separation of the heavier thereof from a liquid carrying said solids in suspension, comprising a tank having a conical lower section, a conduit for the introduction of said liquid into the tank above said lower section, the upper section of said tank having an outlet at the top thereof for the discharge of said liquid only with the lighter of said solids, said upper section having a predetermined height and cross-section for a given rate of upward flow of the liquid with a minimum of turbulence and for the classification of said two solids wherein most of the lighter solid is carried upwardly by said flow to said dischrage opening and the heavier solid is allowed to gravitate out of said flow into said conical lower section, an air supply connected to the lower end of said conical section for the introduction of air thereto and the agitation of the solids accumulating therein to promote their separation therein, means directing the liquid entering the tank across the upper end of said conical section whereby the lighter solids separated out in said conical section and gathering in the upper part thereof are re-entrained and carried upwardly to said outlet, baffles arranged within the tank and intermediate said sections to receive the air so as to preclude agitation of the upper classification section of the tank, vent lines connected to said baffles for the discharge of such air, and means connected to the tank for the withdrawal of the heavier solids gathering in the lower end of said conical section.

References Cited in the file of this patent

UNITED STATES PATENTS

| | | |
|---|---|---|
| 751,645 | Hopkins | Feb. 9, 1904 |
| 1,319,208 | Cole | Oct. 21, 1919 |
| 1,537,424 | Elms | May 12, 1925 |
| 2,105,101 | Stelley | June 11, 1938 |
| 2,664,349 | Sable | Dec. 29, 1953 |